3,180,177
DIRECTIONAL SIGNAL CANCELING MECHANISM
Donald R. Ford, Grosse Pointe Shores, and Peter J. Dryer, Warren, Mich., assignors to Boyne Products, Inc., Boyne City, Mich., a corporation of Michigan
Filed Apr. 17, 1962, Ser. No. 188,181
12 Claims. (Cl. 74—531)

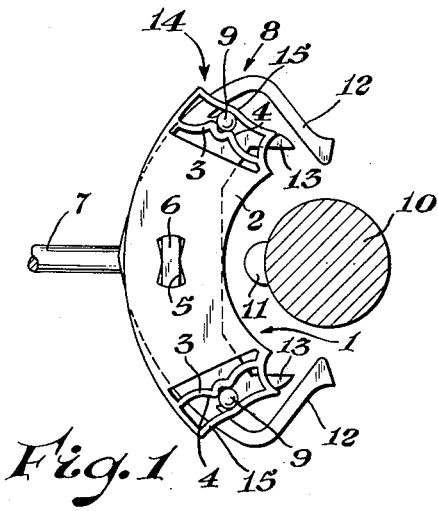
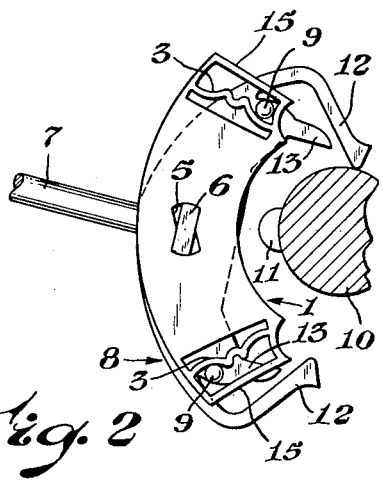
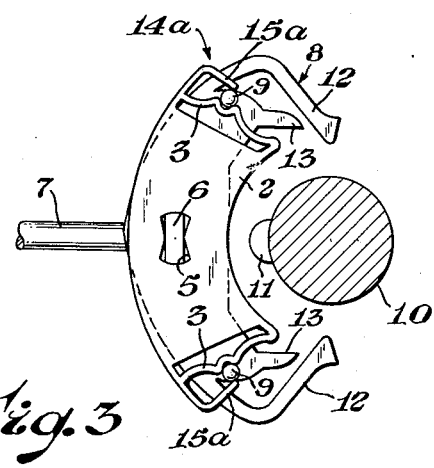
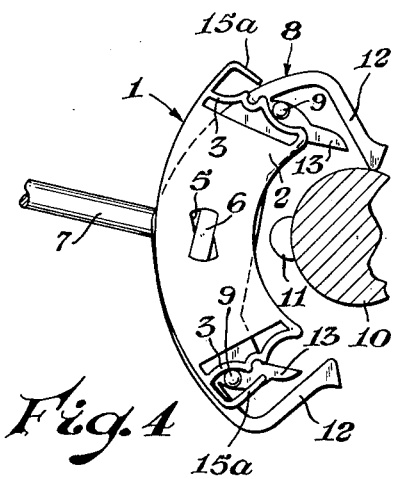
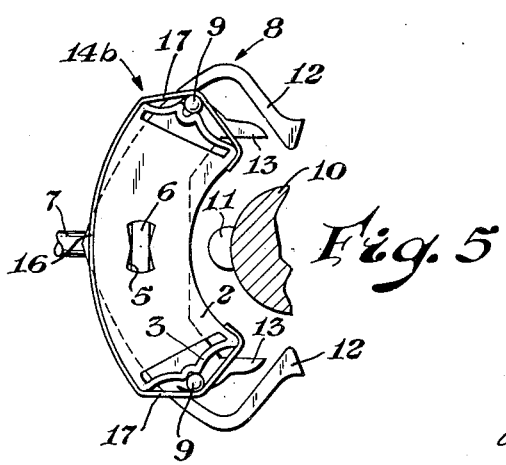

This invention relates to direction signaling apparatus for motor vehicles and more particularly to direction signaling apparatus having automatically operable canceling mechanism provided with apparatus for preventing overcanceling of the signaling apparatus.

Direction signaling apparatus of the kind with which the invention is concerned includes an actuating member which may be adjusted manually from a neutral or inactive position to either one of two operating positions to effect actuation of either the left hand or the right hand set of signaling lamps of a motor vehicle so as to indicate either a left hand or right hand turn. Upon the completion of a turn, canceling means of conventional construction acts on the actuating means to restore the latter to its neutral position, thereby disabling further operation of the signaling lamps and effecting canceling of the turning signal. In many instances, however, and particularly in those vehicles which do not employ power steering means, it is possible to effect canceling of the direction signaling apparatus with such force and speed that the actuating member is moved through its neutral position to its opposite actuating position. This is referred to as overcanceling. In those direction signaling mechanisms provided with operating levers for initiating operation of the signaling apparatus, the tendency to overcancel frequently is augmented by the weight and momentum of the lever.

An object of this invention is to provide means for overcoming overcanceling characteristics of direction signaling apparatus.

Another object of the invention is to provide braking devices operable upon movement of a direction signaling actuating member from an operating position to its neutral position to disable movement of the actuating member beyond its neutral position.

A further object of the invention is to provide braking devices of the character described which do not interfere with or appreciably add to the effort required to initiate operation of the direction signaling mechanism.

Another object of the invention is to provide braking devices of the kind referred to which lends itself to incorporation with existing direction signal devices already in use.

Other objects and advantages of the invention will be pointed out specifically or will become apparent from the following description when it is considered in conjunction with the appended claims and the accompanying drawing, in which:

FIGURE 1 is a plan view of direction signaling apparatus constructed in accordance with one embodiment of the invention and illustrating the mechanism in its neutral position;

FIGURE 2 is a view similar to FIGURE 1 but showing the mechanism in one of its operating positions;

FIGURE 3 is a view similar to FIGURE 1 but disclosing a modified form of the invention;

FIGURE 4 is a view similar to FIGURE 2 but showing the apparatus of FIGURE 3 in an operating position; and FIGURE 5 is a view similar to FIGURE 1 but illustrating another embodiment of the invention.

Apparatus constructed in accordance with the embodiment of the invention illustrated in FIGURES 1 and 2 comprises a support or switch casing member 1 formed of molded plastic material such as nylon or the like and having an arcuate body 2 terminating at each of its ends in a flexible, integral rib 3 having an undulating detent forming surface 4. Between its ends the body member 2 is provided with a substantially hour-glass-shaped opening 5 through which extends a generally rectangular shaft 6 that is connected in any suitable way to an operating lever 7.

Supported on the member 1 for rocking movements relative thereto is an actuating member 8. The shaft 6 is fitted into the body of the actuating member so as to impart movements thereto in response to rocking movements of the lever 7. The actuating member preferably includes means that react with switch members mounted in the casing 1, but such means and switch members are not shown since they form no part of the invention per se.

Adjacent each end of the actuating member 8 is a detent post or stud 9 which bears against the adjacent detent surface 4 of the rib 3 in all positions of the member 8 so as yieldably and releasably to latch the actuating member 8 in any one of its adjusted positions.

The members 1 and 8 are adapted to be mounted adjacent a rotatable member 10, such as the steering shaft of a motor vehicle, which is provided with a canceling cam 11 or the like that rotates with the shaft.

At each end of the actuating member 8 is a flexible, integrally formed canceling or return finger 12 which, when the actuating member is in its neutral position, is located in a position out of the path of rotation of the cam 11. Upon rocking movement of the lever 7 in one direction or the other, however, the actuating member 8 will be rocked to such a position that one or the other of the fingers 12 will be projected into the path of rotation of the cam 11, as is indicated in FIGURE 2. The cooperable detent means 3 and 9 will retain the actuating member 8 in either of its operating positions until such time as the steering member 10 is rotated in a direction to cause the cam 11 to engage the projected finger 12 and move the latter against an abutment 13 that is integrally formed on the actuating member, thereby exerting sufficient force on the actuating member to restore the latter to its neutral position.

The apparatus described thus far is substantially the same as the direction signaling mechanism disclosed in Patent No. 2,999,911 and operates in the same manner.

When the actuating member 8 is in the position indicated in FIGURE 2, extremely rapid rotation of the shaft 10 in a counterclockwise direction may cause the cam 11 to engage the projected return finger 12 with such force and velocity as to move the actuating member through its neutral position to its other actuating position. Movement of the actuating member through such a distance is referred to as overcanceling and the tendency of the actuating member to overcancel may be increased by the length and weight of the operating lever 7.

Apparatus constructed in accordance with the invention includes brake means designated generally by the reference character 14 for preventing overcanceling of the direction signaling apparatus. In FIGURES 1 and 2 the brake means 14 comprises a flexible rib 15 that is substantially coextensive in length with the rib 3. A rib 15 is integrally molded with the body member 1 at each end of the latter and projects beyond the adjacent detent rib 3 a distance sufficient to accommodate therebetween the detent post 9 on the actuating member 8. The spacing between the ribs 3 and 15 preferably is such that when the actuating member 8 is in its neutral position the detent posts 9 are engaged by both sets of ribs 3 and 15, but when the actuating member is adjusted to either of its operating positions, however, the posts 9 preferably are free of engagement with the ribs 15. As a result of the described construction, the ribs 15 offer little resistance to movement of the actuating member 8 from its neutral position to either of its operating positions. Upon movement of the actuating member from an operating position toward its neutral position, however, the detent posts 9 will be gripped by both sets of ribs, whereupon a braking or retarding force will be exerted on the actuating member and prevent its moving through its neutral position.

The embodiment of the invention disclosed in FIGURES 3 and 4 is generally similar to the previously described embodiment, but differs from the latter in that the brake means 14a comprise ribs 15a which are not coextensive in length with the detent ribs 3. Preferably, the ribs 15a terminate at a point substantially midway between the ends of the detent ribs and they are so molded that their free ends will be engaged by the detent posts 9 as the actuating member approaches its neutral position. When the actuating member is in either of its operating positions, however, it is preferred that neither post 9 will engage either of the ribs 15a. The operation of the modified apparatus is the same as has been described with reference to the first embodiment.

In the embodiment of the invention shown in FIGURE 5, the brake means 14b comprises a flexible, elastic, and resilient band 16 which may either partially or wholly surround the body member 2 so as to provide portions 17 that constantly engage the detent posts 9. Bands 16 may be applied to existing direction signaling devices by bonding or the like and may be formed of rubber or any elastic, rubber-like material. The embodiment shown in FIGURE 5 functions in substantially the same manner as the devices heretofore described.

The disclosed embodiments are representative of presently preferred forms of the invention, but are intended to be illustrative rather than definitive thereof. The invention is defined in the claims.

We claim:
1. Direction signaling apparatus comprising an actuating member; a support member; means mounting said actuating member for movement relative to said support member from a neutral position to an operating position, and return; cooperable detent means on each of said members engageable with each other for releasably latching said actuating member in either of said positions; and means mounted on one of said members in a position to engage the detent means on the other of said members in response to movement of said actuating member from its operating position toward the neutral position for forcibly urging said cooperable detent means into latching relation as said actuating member approaches said neutral position.

2. The apparatus set forth in claim 1 wherein said actuating member is mounted for rocking movements from said neutral position to operating positions on opposite sides of said neutral position.

3. Direction signaling apparatus comprising an actuating member; a support member; means mounting said actuating member for movement relative to said support member from a neutral position to an operating position, and return; first detent means on one of said members; second detent means on the other of said members engageable with said first detent means to releasably latch said actuating member in either of said positions; and brake means carried by one of said members in a position to engage the detent means on the other of said members for forcibly urging said first and second detent means into latching relation as said actuating member approaches said neutral position.

4. The apparatus set forth in claim 3 wherein said first detent means comprises an undulating surface, said second detent means comprises a stud engageable with said surface, and said brake means comprises a part having a portion thereof spaced from said surface an amount such as to cause said part to be engaged both by said surface and by said portion of said part.

5. The apparatus set forth in claim 4 wherein said stud is carried by said actuating member, and said undulating surface and said part are on said support member.

6. Direction signaling apparatus comprising an actuating member; a support member; means mounting said actuating member for movements relative to said support member from a neutral position to operating positions on opposite sides of said neutral position, and return; first detent means supported by said support member; second detent means supported by said actuating member and engageable with said first detent means to releasably latch said actuating member in any one of said positions; and brake means supported by one of said members and spaced from the detent means supported thereby a distance to accommodate therebetween the detent means supported by the other of said members, at least a portion of said brake means being engageable with the detent means supported by said other of said members when said actuating member is adjacent said neutral position for exerting a force thereon opposing movement of said actuating member from either of its operating positions ot the other.

7. The apparatus set forth in claim 6 wherein said first detent means comprises an undulating surface and wherein said second detent means comprises a stud engageable with said surface.

8. The apparatus set forth in claim 7 wherein said brake means is supported by said support member.

9. The apparatus set forth in claim 8 wherein said brake means comprises a member substantially coextensive in length with said undulating surface.

10. The apparatus set forth in claim 8 wherein said brake means comprises a part substantially equal to half the length of said undulating surface.

11. The apparatus set forth in claim 8 wherein said brake means is formed of flexible material.

12. The apparatus set forth in claim 8 wherein said brake means is formed of elastic mateiral.

References Cited by the Examiner
UNITED STATES PATENTS 2,815,413  12/57  Ammlung et al. _____ 200—61.35
3,120,588  2/64   Brown _____ 200—61.34

BROUGHTON G. DURHAM, *Primary Examiner.*